(12) United States Patent
Li et al.

(10) Patent No.: US 12,007,128 B2
(45) Date of Patent: Jun. 11, 2024

(54) OUTDOOR UNIT FOR AIR CONDITIONER, AND AIR CONDITIONER

(71) Applicant: MIDEA WELLING MOTOR TECHNOLOGY (SHANGHAI) CO., LTD., Shanghai (CN)

(72) Inventors: Ping Li, Shanghai (CN); Yiming Hu, Shanghai (CN); Guyu Wu, Shanghai (CN); Di Wu, Shanghai (CN)

(73) Assignee: MIDEA WELLING MOTOR TECHNOLOGY (SHANGHAI) CO., LTD., Shanghai (CN)

( * ) Notice: Subject to any disclaimer, the term of this patent is extended or adjusted under 35 U.S.C. 154(b) by 426 days.

(21) Appl. No.: 17/519,021

(22) Filed: Nov. 4, 2021

(65) Prior Publication Data

US 2022/0057089 A1     Feb. 24, 2022

Related U.S. Application Data

(63) Continuation of application No. PCT/CN2020/082114, filed on Mar. 30, 2020.

(30) Foreign Application Priority Data

Sep. 27, 2019  (CN) .......................... 201910926397.X
Sep. 27, 2019  (CN) .......................... 201921629367.4

(51) Int. Cl.
*F24F 1/38*  (2011.01)
*H02K 5/128*  (2006.01)
(Continued)

(52) U.S. Cl.
CPC .............. *F24F 1/38* (2013.01); *H02K 5/128* (2013.01); *H02K 9/06* (2013.01); *H02K 16/00* (2013.01); *F25B 2313/0294* (2013.01)

(58) Field of Classification Search
CPC ....... F25B 2313/0294; F24F 1/06; F24F 1/08; H02K 16/00; H02K 16/02
See application file for complete search history.

(56) References Cited

U.S. PATENT DOCUMENTS 5,117,141 A     5/1992 Hawsey et al.
2006/0273676 A1  12/2006 Naruse et al.
(Continued)

FOREIGN PATENT DOCUMENTS

CN          1983775 A      6/2007
CN        101331362 A     12/2008
(Continued)

OTHER PUBLICATIONS

Extended European Search Report dated May 25, 2022 received in European Patent Application No. EP 20869083.4.
(Continued)

*Primary Examiner* — Jonathan Bradford
(74) *Attorney, Agent, or Firm* — Scully, Scott, Murphy & Presser, P.C.

(57) ABSTRACT

An outdoor unit for an air conditioner, and an air conditioner are provided. The outdoor unit has a housing and a draught fan. The housing is provided with a first air exchange port and a second air exchange port. The draught fan is arranged in the housing and located between the first air exchange port and the second air exchange port. The draught fan has an electric motor, a first fan, and a second fan. The electric motor has two rotors which rotate independently of each other, and a first output shaft and a second output shaft connected to the two rotors respectively. The first output shaft and the second output shaft are respectively fixedly connected to the first fan and the second fan for driving the first fan and the second fan to rotate independently of each other.

19 Claims, 5 Drawing Sheets

(51) Int. Cl.
H02K 9/06 (2006.01)
H02K 16/00 (2006.01)

(56) References Cited

U.S. PATENT DOCUMENTS

| | | | |
|---|---|---|---|
| 2011/0174011 A1 | 7/2011 | Kim et al. | |
| 2012/0222843 A1* | 9/2012 | Mitchell | ............... F04D 19/007 |
| | | | 165/104.34 |
| 2019/0024668 A1* | 1/2019 | Golm, Jr. | ............ F04D 25/0606 |

FOREIGN PATENT DOCUMENTS

| | | |
|---|---|---|
| CN | 202757214 U | 2/2013 |
| CN | 105588230 A | 5/2016 |
| CN | 109028348 A | 12/2018 |
| CN | 109245400 A | 1/2019 |
| CN | 208364446 U | 1/2019 |
| CN | 110044008 A | 7/2019 |
| EP | 3309095 A1 | 4/2018 |
| WO | 2010104360 A2 | 9/2010 |

OTHER PUBLICATIONS

International Search report dated Jun. 30, 2020 received in International Application No. PCT/CN2020/082114 together with an English language translation.

* cited by examiner

OUTDOOR UNIT FOR AIR CONDITIONER, AND AIR CONDITIONER

CROSS-REFERENCE TO RELATED APPLICATIONS

The present application is a continuation application of PCT International Application No. PCT/CN2020/082114, filed on Mar. 30, 2020, which claims priority to and benefits of Chinese Patent Application No. 201910926397.X filed with China National Intellectual Property Administration on Sep. 27, 2019 and Chinese Patent Application No. 201921629367.4 filed with China National Intellectual Property Administration on Sep. 27, 2019, the entire contents of which are incorporated herein by reference for all purposes. No new matter has been introduced.

FIELD

The present disclosure relates to the technical field of air conditioning, in particular, to an outdoor unit for an air conditioner, and an air conditioning apparatus comprising the outdoor unit.

BACKGROUND

The outdoor units for air conditioners, which are available on the market, are usually single-stage fans, and after they have been used for a period of time or used in harsh environments, air volume produced by the outdoor units will be greatly attenuated, and consequently the heat exchange ability of outdoor heat exchangers is lowered.

SUMMARY

In order to solve at least one of the above technical problems, the present disclosure provides an outdoor unit for an air conditioner.

According to another aspect of the present disclosure, an air conditioning apparatus comprising the above outdoor unit is provided.

In order to achieve the above objects, the first aspect of the present disclosure provides an outdoor unit for an air conditioner, comprising: a housing and a draught fan, wherein the housing is provided with a first air exchange port and a second air exchange port, the draught fan is arranged in the housing and located between the first air exchange port and the second air exchange port, wherein the draught fan comprises an electric motor, a first fan and a second fan, and the electric motor comprises two rotors which rotate independently of each other; and a first output shaft and a second output shaft connected to the two rotors respectively, and the first output shaft and the second output shaft protrude, respectively, towards the same side of an axial direction of the electric motor along the axial direction of the electric motor, and the first output shaft and the second output shaft are respectively fixedly connected to the first fan and the second fan, and are used for driving the first fan and the second fan to rotate independently of each other.

The housing of the outdoor unit provided by the first aspect of the present disclosure is provided with a first air exchange port and a second air exchange port, so that air flow can enter the housing through the first air exchange port and flow out through the second air exchange port, or the air flow enters the housing through the second air exchange port and flows out through the first air exchange port. The draught fan comprises a first fan and a second fan, and the two fans cooperate with each other, which can significantly increase the air volume of the draught fan, so that the air volume of the outdoor unit can be increased in poor heat dissipation conditions such as a closed periphery and an internal blockage, i.e., the air volume and the wind power of the outdoor unit can be improved significantly, thereby improving the heat exchange effect of an outdoor heat exchanger and helping improve the efficiency of the air conditioning apparatus. Meanwhile, since the electric motor comprises two rotors which rotate independently of each other and two output shafts, the two rotors can rotate at the same speed, at different speeds, in the same direction or in different directions, so that the two fans can rotate at the same speed, at different speeds, in the same direction or in different directions, and then, after the air flows generated by the two fans are superimposed on each other, the draught fan can be made to supply air to the first air exchange port, the second air exchange port, the housing or other structures in the housing at a constant wind speed or wind form, or at variable wind speeds or wind forms, i.e., it can control the air volume and the wind power and can also control an air supply direction and an air supply angle, to satisfy different requirements of the outdoor unit, which greatly improves the performance of the outdoor unit. For example, when the draught fan supplies air to the second air exchange port, the heat exchange effect of the outdoor heat exchanger can be improved; when the draught fan supplies air to the first air exchange port, the moisture, the rainwater and the like within the housing can be blown out, so that the outdoor unit has a self-drying function; when the draught fan supplies air to the housing or other structures (such as the outdoor heat exchanger and an air-inlet grille) in the housing, these components are impacted by the air flow and/or generate vibration, so that substances such as dust, litter or greasy dirt are stripped off and the self-drying function is achieved.

In addition, only one of the two rotors starts according to actual conditions to reduce energy consumption; or they start one after the other, and then the start order of the first fan and the second fan is controlled, so that the fan that starts later is started by the wind power of the fan that starts first, and therefore, it is beneficial to ensure the normal start of the draught fan under headwind conditions or other harsh environments. In addition, the present disclosure uses one draught fan to drive two fans to rotate, and thus achieves structure integration of the draught fan, so that the coaxiality of the first fan and the second fan is better guaranteed, which thus is helpful for increasing air output volume and improving work efficiency. Compared with a solution which uses two electric motors to respectively drive two fans, the number of mounting procedures of the outdoor unit is reduced, and the number of mounting racks for installing the electric motors is reduced. On the one hand, the present disclosure simplifies the mounting process of the outdoor unit, lowers the difficulty of assembly, and saves the time and labor costs, and on the other hand, the present disclosure saves the mounting space of the mounting rack, reduces the mounting space of the draught fan, and helps reduce the size and the specification of the outdoor unit and is helpful for the miniaturization of the outdoor unit.

The first output shaft and the second output shaft protrude towards the same side of an axial direction of the electric motor, so that the end in the axial direction of the electric motor can output two powers that do not interfere with each other. Compared with an electric motor with shafts protruding towards two sides of the axial direction of the electric motor, the axial gap between the two fans can be further reduced, and thus the efficiency of the draught fan is improved. Compared with the solution of using two electric motors to drive the two fans, the present disclosure saves the axial space of one electric motor and helps reduce the axial size of the outdoor unit. Since the two rotors are independent of each other and the first output shaft and the second output shaft are independent of each other, the electric motor can output two independent torques, which is equivalent to using one electric motor to achieve the function of two independent electric motors, and thus, the present disclosure has significant advantages of a compact structure, an excellent practical functionality, convenient mounting, a small axial size and a low manufacturing cost.

It can be understood that the curving direction of the blades of the first fan, the curving direction of the blades of the second fan, the rotating direction of the first fan, the rotating direction of the second fan, the air supply direction of the first fan, and the air supply direction of the second fan have the following relations: when the curving direction of the blades of the first fan is opposite to that of the second fan, and the rotating direction of the first fan is opposite to that of the second fan, their air supply directions are the same; and when the curving direction of the blades of the first fan is the same with that of the second fan, and the rotating direction of the first fan is the same with that of the second fan, their air supply directions are the same.

In addition, the outdoor unit provided by the present disclosure can further comprise the following additional technical features.

According to the above embodiment, the electric motor is a variable-frequency axial air gap electric motor.

As the electric motor is a variable-frequency axial air gap electric motor, the stator and the rotors of the electric motor form an axial air gap, which helps reduce the radial size of the electric motor, and further reduce the size of the outdoor unit, and thus, the present disclosure makes it convenient to assemble the electric motor in the housing and reduce the requirements of the outdoor unit on assembling space, and helps expand the application range of the outdoor unit. The present disclosure ensures the adjustability of the rotating speeds and the rotating directions of the two rotors, and further adjusts the cooperation modes of the first fan and the second fan to meet different functional needs of the outdoor unit.

According to the above embodiment, the variable-frequency axial air gap electric motor comprises a stator and the two rotors, the stator comprises a stator core and two sets of windings independent of each other, the two ends in the axial direction of the stator core are provided with stator teeth protruding towards two sides in the axial direction of the stator core, and the two sets of windings are respectively wound on the two sets of stator teeth, the two rotors are coaxially arranged on both sides in the axial direction of the stator opposite to each other, and form an axial air gap with the stator.

The present disclosure achieves the independent outputs of dual powers of one electric motor through using the cooperation between one stator and two rotors independent of each other and two output shafts independent of each other, and thus the two fans can be driven to rotate independently at their own rotating speeds and in their own rotating directions, while do not interfere with each other. Compared with a technical solution that two electric motors extend in an axial direction opposite to each other and are connected with two fans respectively, the present disclosure saves one stator, reduces the axial size of the draught fan, reduces the cost of the draught fan, and further helps reduce the size of the outdoor unit and reduces the cost thereof.

Compared with a technical solution that an electric motor with a single shaft cooperate with a gear mechanism to achieve extending towards two ends in an axial direction, the present disclosure achieves that two fans rotate at any rotating speeds and in any rotating directions, and thus has excellent practical functionality, significantly improves the functional diversification of the draught fan, and thus improves the functional diversification of the outdoor unit, saves the gear mechanism and reduces manufacturing and mounting difficulty of the product.

According to the above embodiment, the variable-frequency axial air gap electric motor comprises two stators and the two rotors, and the two stators correspond to the two rotors one by one, each of the stators comprises a stator core and a winding; each of the stator cores is provided at one end in the axial direction with stator teeth protruding along the axial direction; the stator teeth are wound with the winding corresponding to it; each of the rotors is provided at the side of the axial direction of the stator corresponding to it, and forms an axial air gap with the corresponding stator.

The present disclosure achieves the independent outputs of dual powers of one electric motor through using the cooperation between two stators and two rotors independent of each other and two rotating shafts independent of each other, which is equivalent to the integration of the inner structures of the two electric motors. Compared with two independent electric motors, the present disclosure decreases the number of the mounting racks, lowers the mounting difficulty of the draught fan, decreases the mounting space of the draught fan. In addition, each stator and each rotor can be designed reasonably according to requirements, so as to satisfy the requirements on the functions of the product.

According to the above embodiment, the two rotors are arranged opposite to each other and provided at an inner side of the axial direction of the two stators.

The two rotors are arranged opposite to each other and provided at an inner side of the axial direction of the two stators, and then a relatively good processability is acquired and the assembly is convenient. The two rotors can also be provided at an external side of the axial direction of the two stators, or one rotor is provided at an inner side of the axial direction of the two stators while the other is provided at the external side of the axial direction of the two stators.

According to any of the above embodiments, a center portion of the stator core is provided with a hollow channel in a radial direction, and at least a portion of the first output shaft and at least a portion of the second output shaft are arranged in the hollow channel.

The center portion of the stator core is provided with a hollow channel in the radial direction, which provides a helpful axial mounting space for the mounting of the first output shaft and the second output shaft, so that the two output shafts can be partially or completely accommodated in the hollow channel of the stator core, thereby further decreasing the axial size of the electric motor. Compared with a conventional radial electric motor, the increase of the axial space, which is because the output shaft must be supported by end portions, can be avoided, and the axial space of the electric motor is effectively decreased. In addition, it is rendered that the action radius of the electromagnetic force of the axial air gap electric motor moves outwards, which means that the torque generated by the same electromagnetic force increases, and then, in a fixed designed torque, the electromagnetic force needed by the axial air gap electric motor is reduced, and thereby, the design size and space of the electromagnets will be reduced, which is helpful for the miniaturization of the electric motor.

According to any of the above embodiments, the stator core comprises a stator yoke and a plurality of stator tooth portions arranged along a circumferential direction of the stator yoke, the plurality of stator tooth portions are assembled with the stator yoke to form the stator core, and the plurality of stator tooth portions protrude along an axial direction of the stator yoke to form the stator teeth, the rotor comprises a rotor disk and a permanent magnet provided on the rotor disk.

The stator core comprises a stator yoke and a plurality of stator tooth portions, and the plurality of stator tooth portions are assembled with the stator yoke to form the stator core, and then, the stator yoke and the stator tooth portions are detachably connected to each other, and thus, the windings will not be restricted by the shape of the stator core when wound, and each stator tooth portion can further be connected with the stator yoke after the windings are wound, and the winding manner is flexible and thus the winding efficiency is improved. In addition, through reasonably disposing the size of the stator tooth portions or the distance between the stator tooth portions, the size of a winding groove can be adjusted, so that the number of the sets of the windings can be disposed flexibly and the power rating of the stator core can be adjusted appropriately. The stator tooth portions and the stator yoke can also be formed integrally.

The rotor comprises a rotor disk and a permanent magnet, and the rotor disk is used as a mounting carrier of the permanent magnet, and the coaxial connection between the rotor and the first output shaft or the second output shaft is also achieved, the permanent magnet is mounted on the rotor disk, and generates a magnetic field which is interactive with the stator, and makes the rotors integrally form a flat disk structure, which helps further decrease the axial size of the electric motor. The external portion of the body of the rotor disk is a disk-shaped structure and has a relatively regular structure, which favors processing and molding and also favors the arrangement of multiple permanent magnets, the internal portion of the body of the disk is a disk-shaped structure or a conical structure, which helps reasonably design the assembling structure of the rotor disk and a rotating shaft component according to the specific structure of a product, and provides a helpful space for the mounting of other parts.

According to any of the above embodiments, at least one of the first output shaft and the second output shaft is a hollow shaft, the other one goes through the hollow shaft and outputs from the same side of the axial direction of the electric motor, and is adapted to rotate with respect to the hollow shaft.

One of the first output shaft and the second output shaft is a hollow shaft, and then the other one can extend through the hollow shaft, thereby achieving the protruding of the first output shaft and the second output shaft in the same direction, so that one end of the axial direction of the electric motor can be connected with two fans at the same time. With regard to the other output shaft, it can be a solid shaft, which helps improve the strength of the output shaft. The other output shaft can also be a hollow shaft.

According to any of the above embodiments, a heat exchanger is provided in the housing, and is provided at the first air exchange port.

A heat exchanger is provided in the housing so as to ensure that the air conditioner outdoor unit can exchange heat with the outside, and the heat exchanger is provided at the first air exchange port, and then, when air flow enters the outdoor unit through the first air exchange port, rainwater may also enter the outdoor unit through the first air exchange port on a rainy day, which gets the heat exchanger or other structures of the outdoor unit damp. At this moment, the first fan and the second fan can be controlled to supply air to the first air exchange port, the air flow will blow out from the first air exchange port through the heat exchanger, and further, the self-drying of the outdoor unit is achieved, which helps improve the reliability of the outdoor unit in use.

According to any of the above embodiments, the outdoor unit further comprises a controller, wherein the controller is electrically connected with the draught fan, and is used for controlling the start and stop, the rotating speeds and the rotating directions of the first fan and the second fan.

The outdoor unit further comprises a controller, wherein the controller is electrically connected with the draught fan and can control the start and stop, the rotating speeds and the rotating directions of the first fan and the second fan, so that the draught fan can be used in the normal cooling or heating process of the air conditioning apparatus, and can also be used independently, thereby improving the functionality of the outdoor unit. For example, when the outdoor unit needs to be cleaned, the draught fan is started respectively, and thus the dust, greasy dirt, litter and the like on the component which needs to be cleaned are stripped off; when the outdoor unit needs to be dried, the draught fan is started respectively to blow air to the first air exchange port to conduct self-drying. The controller can be integrated in the control system of the air conditioning apparatus, or disposed respectively.

According to the above embodiment, the controller is adapted to control the first fan and the second fan to supply air to the second air exchange port by a fixed combination of rotating speeds.

According to the above embodiment, the controller is adapted to control the first fan and the second fan to supply air to the first air exchange port by a fixed combination of rotating speeds.

In a normal operating process of a cooling mode or a heating mode of the air conditioning apparatus, one of the two air exchange ports is an air inlet and the other is an air outlet, which is generally determined by the positions of the first air exchange port and the second air exchange port.

Since the draught fan comprises two fans, the two fans can make the draught fan generate the same air volume by different combinations of rotating speeds. When the air volume of the draught fan is fixed, the heat exchange effect of the air conditioner outdoor unit can be detected through changing the combination of rotating speeds of the first fan and the second fan, and a better combination of rotating speeds is further rendered, so that the air volume of the draught fan and the combination of rotating speeds of the two fans form a fixed matching method. Thus, the first fan and the second fan supply air to the air outlet by certain fixed combinations of rotating speeds in use, so that the outdoor unit has the best heat exchange effect and efficiency under a corresponding load, and the outdoor unit achieves the object of saving energy and improving efficiency. A fixed load can be defined by a designer as a specific load value (i.e., the air volume of the outdoor unit), or defined to indicate a certain degree of low load, medium load or high load (i.e., low air volume, medium air volume or high air volume), and under such loads, the first fan and the second fan supply air to the air outlet by a fixed combination of rotating speeds, so that the outdoor unit has the best heat exchange effect and the best efficiency.

However, on rainy days or windy days, the outdoor unit may be humidified due to water entry, and further, the internal structures, such as the electric motor and the heat exchanger, of the outdoor unit will be further affected or damaged, and in the normal operating process of a cooling mode or a heating mode of the air conditioning apparatus, the air flow usually enters the housing through the air inlet and flows out of the housing through the air outlet, and thus the rainwater at the air inlet may be further suctioned into the housing and cause harmful consequences, while the rainwater and the like at the air outlet may be directly blown out to achieve drying. Therefore, the outdoor unit is enabled to have the function of self-drying through controlling the first fan and the second fan to supply air to the air inlet, and thus the probability of failure of the outdoor unit due to moisture is reduced. Further, when the air volume or the power of the draught fan is fixed, the two fans can have different combinations of rotating speeds. When the air volume or the power of the draught fan is fixed, the self-drying effect of the outdoor unit can be detected through changing the combination of rotating speeds of the first fan and the second fan, and then a better combination of rotating speeds is acquired, so that the air volume or the power of the draught fan and the combination of rotating speeds of the two fans form a fixed matching method. Thus, when the outdoor unit needs to be dried by itself, the first fan and the second fan are controlled by a controller to supply air to the air inlet by a certain fixed combination of rotating speeds, so that the outdoor unit has the best self-drying effect and efficiency in a corresponding air volume or power.

Therefore, when the first air exchange port is the air inlet and the second air exchange port is the air outlet, the controller controls the first fan and the second fan to supply air to the second air exchange port by a fixed combination of rotating speeds, so that the air conditioner outdoor unit has the best heat exchange effect and efficiency under certain fixed loads, the controller controls the first fan and the second fan to supply air to the first air exchange port by a fixed combination of rotating speeds, so that the outdoor unit has the best self-drying effect and efficiency under certain fixed powers or air volumes. Based on the same reasons, when the first air exchange port is the air outlet and the second air exchange port is the air inlet, the controller controls the first fan and the second fan to supply air to the first air exchange port by a fixed combination of rotating speeds, so that the outdoor unit has the best heat exchange effect and efficiency under certain fixed loads, the controller controls the first fan and the second fan to supply air to the second air exchange port by a fixed combination of rotating speeds, so that the outdoor unit has the best self-drying effect and efficiency under certain fixed powers or air volumes.

According to the above embodiment, the controller is adapted to control at least one of the first fan and the second fan to operate at a constant rotating speed or a variable rotating speed, to form a constant impact air flow or a variable impact air flow.

The controller controls the fans to operate to form a constant impact air flow or a variable impact air flow which acts on substances such as dust, greasy dirt and litter accumulated on the housing, the heat exchanger or other components of the outdoor unit, thereby achieving an automatic stripping off the substances such as dust, greasy dirt and litter from the outdoor unit due to the air flow impact, and thus, the outdoor unit has the function of self-cleaning, thereby reducing the frequency of manual overhauling or manual cleaning, and then improving the user experience. For example, the first fan and the second fan can be configured to have a constant rotating speed at the same time, and thus, the draught fan generates a constant impact air flow, then the speed and the air supply angle of the air flow keep constant, and further, the outdoor unit has the function of self-cleaning. One of the first fan and the second fan may also be configured to have a constant rotating speed and the other is configured to have a variable rotating speed, or both the first fan and the second fan are configured to have a variable rotating speed, so that the draught fan generates an impact air flow in which the wind speed is changed while the air supply angle keeps unchanged, or the air supply angle is changed while the wind speed keeps unchanged, or both the wind speed and the air supply angle are changed, and such changed impact air flow can act on different components of the outdoor unit like scanning, and thus, the outdoor unit has the comprehensive function of self-cleaning.

According to the above embodiment, the controller is adapted to control the first fan and the second fan to operate at a fixed rotating speed or operate at a variable speed in a rotating speed range with top and bottom floating thresholds based on the fixed rotating speed, so that an operating frequency of the draught fan reaches a resonant frequency of a portion of the structures of the outdoor unit.

The first fan and the second fan operate at a fixed rotating speed, so that the operating frequency of the draught fan reaches a working frequency of a portion of the structures (such as the housing, the heat exchanger or other components) of the outdoor unit, and then, the portion of the structures will resonate and generate a relatively strong mechanical vibration, and further, substances such as dust, greasy dirt and litter are stripped off automatically from the outdoor unit due to the mechanical vibration, and the outdoor unit has the function of self-cleaning. Alternatively, based on the fixed rotating speed, appropriate top and bottom floating thresholds are set, the first fan and the second fan operate at a variable speed in a rotating speed range, and the rotating speed changes slowly, and when the speed is changed to be the above fixed rotating speed, a portion of the structures of the outdoor unit will resonate; when it deviates from the above fixed rotating speed, the portion of the structures will stop the strong vibration, which can prevent structure damage or failure of the portion of the structures of the outdoor unit due to long time continuous resonance, and thus, on the basis of ensuring the use reliability of the outdoor unit, the outdoor unit has the function of self-cleaning.

It should be understood that resonance frequencies of different components of the outdoor unit are different, and thus, the above fixed rotating speed is changed based on the change of the structures of the outdoor unit.

According to the above embodiment, the controller is adapted to control one of the first fan and the second fan to start first, and the other fan is adapted to start by the wind power of the fan that starts first.

The controller can control the first fan and the second fan to start one after another, so that the fan that starts later is started by the wind power of the fan that starts first, and thus a starting torque of one of the fans is reduced, which helps lower the power requirements of the electric motor and meanwhile helps achieve headwind start of the draught fan. For example, the draught fan is disposed between the first air exchange port and the second air exchange port, generally, one of the two air exchange ports (for example, the second air exchange port) is easily interfered by external environment, then the fan close to the first air exchange port can be controlled to start first, and the fan that has started will provide certain start boost to the fan close to the second air exchange port. Thus, in the absence of external wind interference, the second fan close to the second air exchange port has a relatively small starting torque, in the case of headwind, the fan close to the second air exchange port can still start normally, thereby achieving headwind start.

According to any of the above embodiments, the axis of the draught fan is along a vertical direction; or the axis of the draught fan is along a horizontal direction.

The axis of the draught fan extends along a vertical direction, and then the air supply direction of the first fan and the second fan is a vertical direction, and the mounting surface required by the draught fan is a horizontal plane. Thus, in the case that the fans of the air conditioner outdoor unit are heavy, the fans will not be affected by the gravity and continuously keep a good rigidity, and reduce the abrasion of the draught fan, and they are suitable for an outdoor unit with a high power requirement.

The axis of the draught fan extends along a horizontal direction, then the air supply direction of the first fan and the second fan is a horizontal direction, and the mounting surface required by the draught fan is a vertical plane, which is helpful for the mounting of the outdoor unit on the outer side of a wall, and in consideration of the effect of gravity, the product is relatively suitable for an outdoor unit with a low power requirement.

According to a second aspect of the present disclosure, an air conditioning apparatus is provided. The air conditioning apparatus comprises the outdoor unit according to any one of the above embodiments according to the first aspect, and an air conditioning indoor unit connected with the outdoor unit.

The air conditioning apparatus according to the second aspect of the present disclosure comprises the outdoor unit according to any one of the above embodiments according to the first aspect, and thus has all the beneficial effects associated with the embodiments, which will not be repeated herein.

The additional aspects and advantages of the present disclosure will be obvious in the following description, or can be understood through the implementation of the present disclosure.

BRIEF DESCRIPTION OF THE DRAWINGS

The above and/or additional aspects and advantages of the present disclosure will become apparent and readily understood from the description of embodiments in conjunction with the following drawings.

Figure 1:
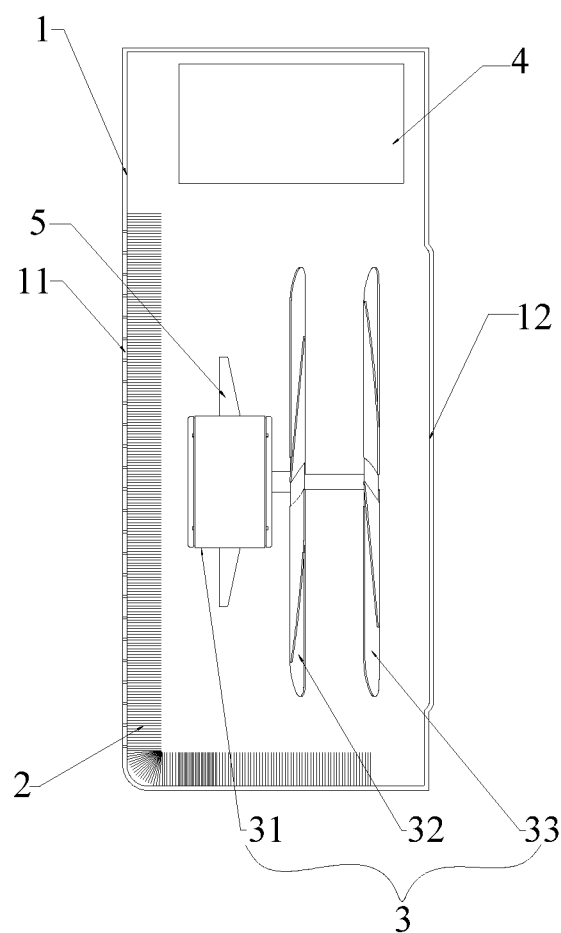
FIG. 1 is a schematic view of the structure of an outdoor unit for an air conditioner, provided in an embodiment of the present disclosure.

The reference numerals of FIGS. 1-11 are described as follows:

1 housing; 11 first air exchange port; 12 second air exchange port; 2 heat exchanger; 3 draught fan; 31 variable-frequency axial air gap electric motor; 311 stator; 3111 stator core; 3112 hollow channel; 3113 stator yoke; 3114 stator tooth portion; 3115 winding; 312 rotor; 3121 rotor disk; 3122 permanent magnet; 3131 first output shaft; 3132 second output shaft; 32 first fan; 33 second fan; 4 refrigerating system; 5 mounting rack; 8 controller.

The parallel arrows in FIGS. 3-6 indicate an air supply direction of a fan, while the curve arrows indicate a rotating direction of the fan.

DETAILED DESCRIPTION OF THE EMBODIMENTS

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

An outdoor unit for an air conditioner and an air conditioning apparatus according to certain embodiments of the present disclosure are described as follows, with reference to FIG. 1 to FIG. 11.

Firstly, embodiments according to the first aspect are introduced, and include outdoor units for air conditioners.

Embodiment 1

Figure 2:
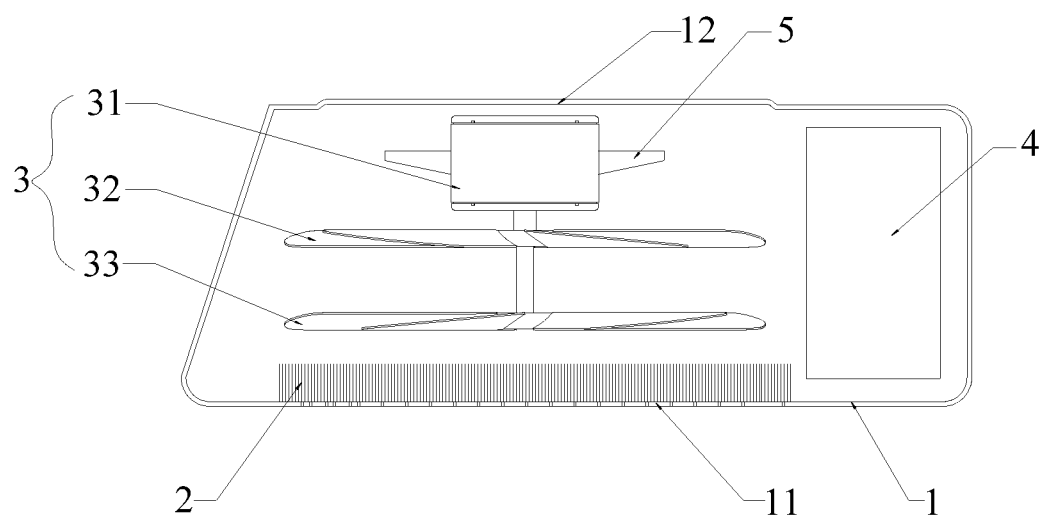
FIG. 2 is a schematic view of the structure of an outdoor unit for an air conditioner, provided in an embodiment of the present disclosure.

An air conditioner outdoor unit comprises a housing 1 and a draught fan 3, as shown in FIG. 1 and FIG. 2.

For example, the housing 1 is provided with a first air exchange port 11 and a second air exchange port 12, as shown in FIG. 1 and FIG. 2.

The draught fan 3 is provided in the housing 1 and disposed between the first air exchange port 11 and the second air exchange port 12, as shown in FIG. 1 and FIG. 2.

Figure 7:
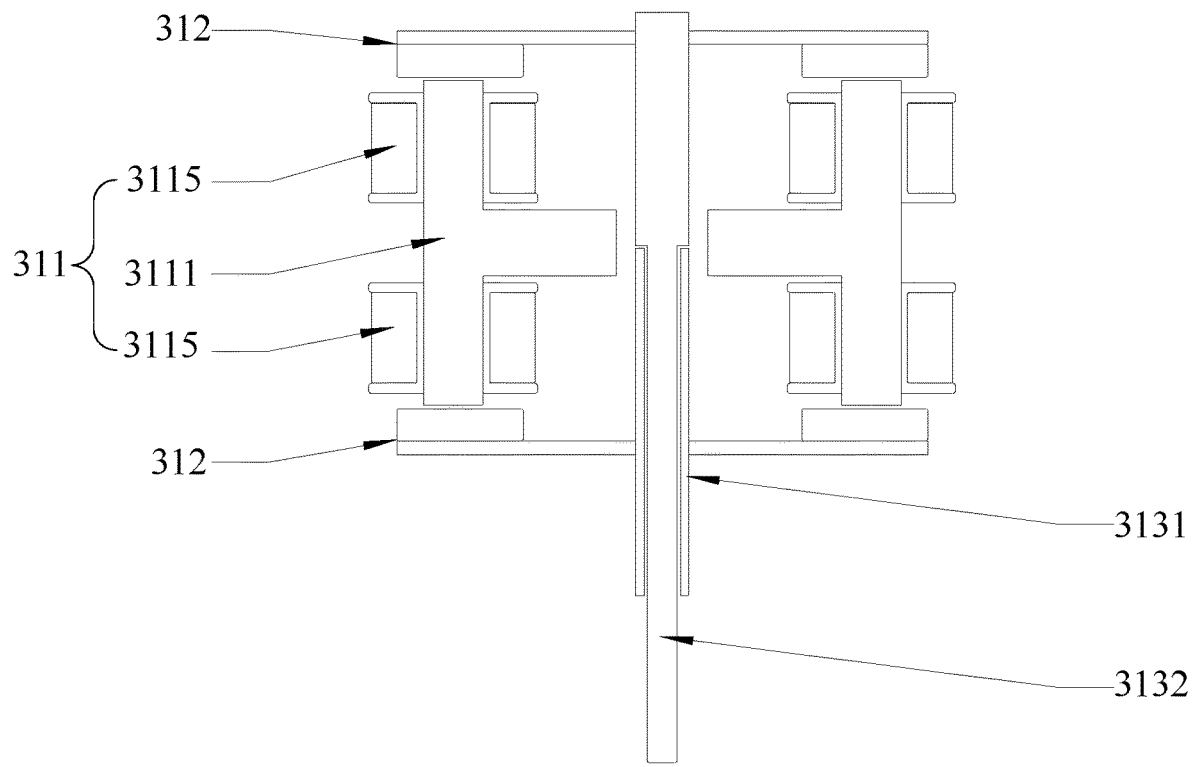
FIG. 7 is a schematic view of the structure of an electric motor provided in an embodiment of the present disclosure.
Figure 8:
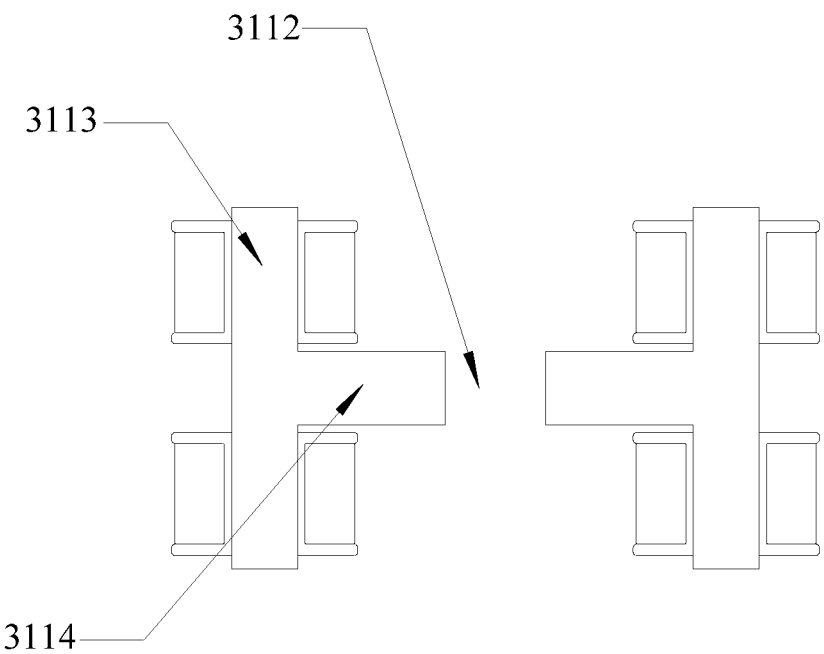
FIG. 8 is a schematic view of the structure of the stator in FIG. 7.

The draught fan 3 comprises an electric motor, a first fan 32 and a second fan 33. The electric motor comprises two rotors 312 that rotate independently of each other, and a first output shaft 3131 and a second output shaft 3132 connected to the two rotors 312 respectively, as shown in FIG. 7 and FIG. 8. The first output shaft 3131 and the second output shaft 3132 protrude, respectively, towards a same side of an axial direction of the electric motor along the axial direction of the electric motor, and the first output shaft 3131 and the second output shaft 3132 are respectively fixedly connected to the first fan 32 and the second fan 33, and are used for driving the first fan 32 and the second fan 33 to rotate independently of each other.

An embodiment of the first aspect of the present disclosure provides an outdoor unit for an air conditioner. The housing 1 is provided with the first air exchange port 11 and the second air exchange port 12, and the air flow enters the housing 1 through the first exchange port and flows out through the second air exchange port 12. Alternatively, the air flow enters the housing 1 through the second air exchange port 12 and flows out of the housing 1 through the first air exchange port 11. The draught fan 3 comprises the first fan 32 and the second fan 33, and the two fans cooperate with each other, which can increase the air volume of the draught fan 3 and increase the air volume of the air conditioner outdoor unit in an environment with poor heat dissipation conditions, such as a closed periphery and internal blockage. In other words, the air volume and the wind power of the outdoor unit can be significantly improved, and thus the heat exchange effect of an outdoor heat exchanger can be improved, which is helpful for improving the efficiency of the air conditioning apparatus.

Meanwhile, since the electric motor comprises two rotors 312 which rotate independently of each other and two output shafts, the two rotors 312 can rotate at the same speed, at different speeds, in the same direction or in different directions, so that the two fans can rotate at the same speed, at different speeds, in the same direction or in different directions, and then, after the air flows generated by the two fans are superimposed on each other, the draught fan 3 can supply air to the first air exchange port 11, the second air exchange port 12, the housing 1 or other structures in the housing 1 by a constant or variable wind speed or wind form. In other words, the air volume and wind power can be controlled and the air supply direction and the air supply angle can also be controlled, to satisfy different requirements of the air conditioner outdoor unit and greatly improve the performance of the air conditioner outdoor unit.

For example, when the draught fan 3 supplies air to the second air exchange port 12, the heat exchange ability of the outdoor heat exchanger can be improved; when the draught fan 3 supplies air to the first air exchange port 11, the moisture, the rainwater and the like within the housing 1 can be blown out so that the air conditioner outdoor unit has a self-drying function; when the draught fan 3 supplies air to the housing 1 or other structures (such as the outdoor heat exchanger and an air-inlet grille) in the housing 1, these components are impacted by the air flow and/or generate vibration, so that substances such as dust, litter and greasy dirt are stripped off and the self-drying function is achieved.

In addition, only one of the two rotors 312 may start according to actual conditions to reduce energy consumption; or they start one after the other, and thus the start order of the first fan 32 and the second fan 33 is controlled, so that the fan that starts later is started by the wind power of the fan that starts first, and therefore, it is beneficial to ensure the normal start of the draught fan 3 under headwind conditions or other harsh environments.

In addition, one draught fan 3 is used to drive two fans to rotate according to this embodiment, and thus structure integration of the draught fan 3 can be achieved, so that the coaxiality of the first fan 32 and the second fan 33 can be additionally ensured, which helps increase air output volume and improve work efficiency. Compared with a solution which uses two electric motors to respectively drive two fans, the number of mounting procedures of the air conditioner outdoor unit is reduced, and the number of mounting racks 5 for installing the electric motors is reduced. On the one hand, the present disclosure simplifies the mounting process of the air conditioner outdoor unit, lowers assembling difficulty, and saves time and labor costs, and on the other hand, the present disclosure saves the mounting space of the mounting rack 5, reduces the mounting space of the draught fan 3, and helps reduce the size and the specification of the air conditioner outdoor unit and is helpful for the miniaturization of the air conditioner outdoor unit.

The first output shaft 3131 and the second output shaft 3132 protrude towards the same side of an axial direction of the electric motor, so that the end in the axial direction of the electric motor can output two powers that do not interfere with each other. Compared with the case that the shafts protrude towards the two sides of the axial direction of the electric motor, the axial gap between the two fans can be further reduced, and thus the efficiency of the draught fan is further improved. Compared with the solution of using two electric motors to drive the two fans, the present disclosure saves the axial space of one electric motor and helps reduce the axial size of the air conditioner outdoor unit. Since the two rotors 312 are independent of each other and the first output shaft 3131 and the second output shaft 3132 are independent of each other, the electric motor can output two independent torques, which is equivalent to using one electric motor to achieve the function of two independent electric motors, and thus, the present disclosure has significant advantages of a compact structure, an excellent practical functionality, convenient mounting, a small axial size and a low manufacturing cost.

Figure 3:
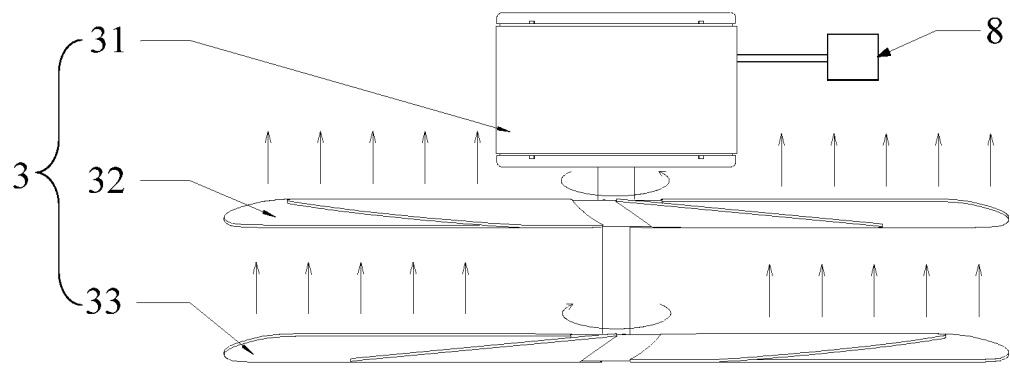
FIG. 3 is a schematic view of a first state of a draught fan provided in an embodiment of the present disclosure.
Figure 4:
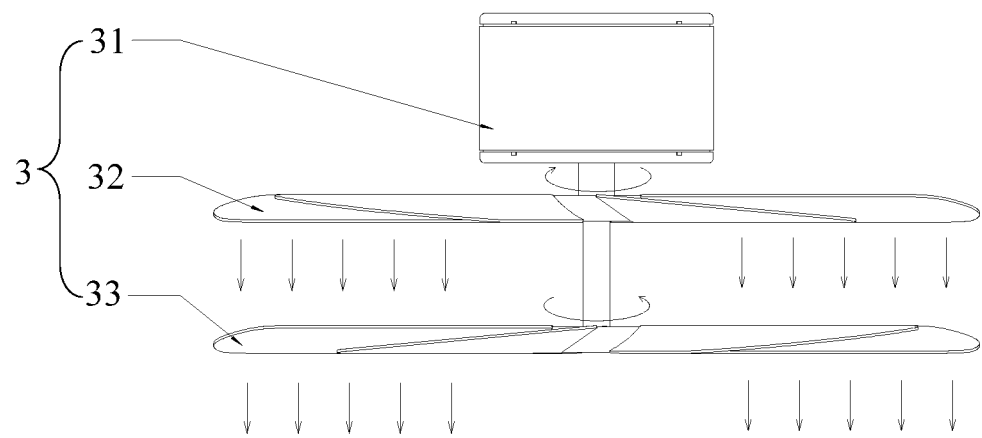
FIG. 4 is a schematic view of a second state of the draught fan as shown in FIG. 3.
Figure 5:
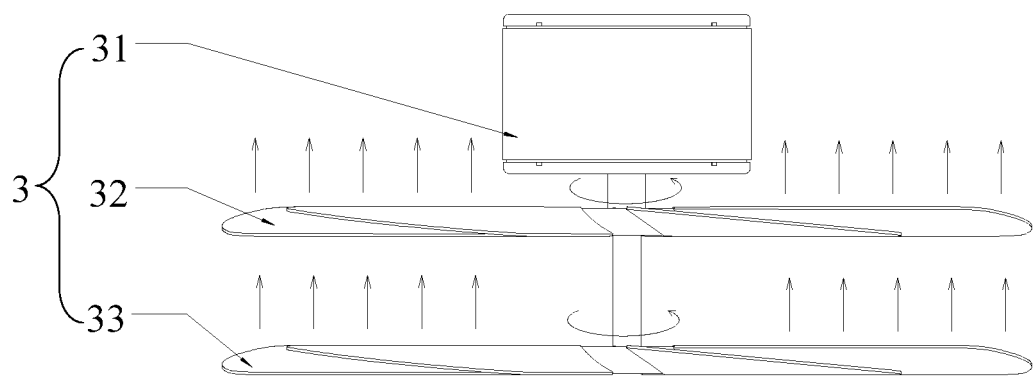
FIG. 5 is a schematic view of a first state of a draught fan provided in an embodiment of the present disclosure.
Figure 6:
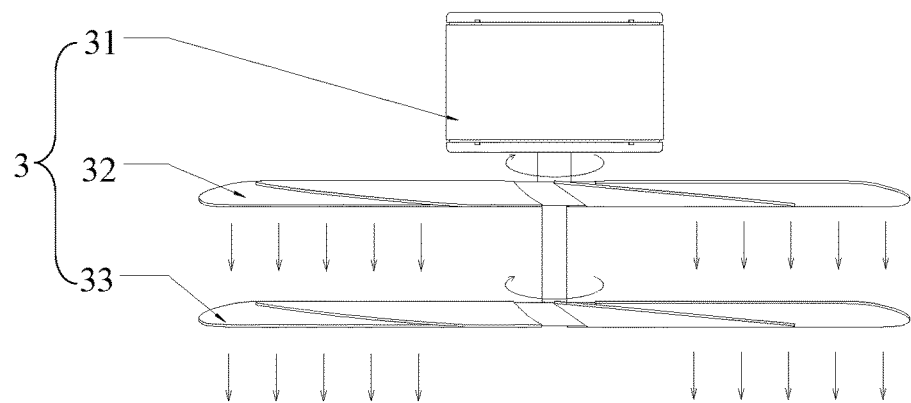
FIG. 6 is a schematic view of a second state of the draught fan as shown in FIG. 5.

It can be understood that the curving direction of the blades of the first fan 32, the curving direction of the blades of the second fan 33, the rotating direction of the first fan 32, the rotating direction of the second fan 33, the air supply direction of the first fan 32, and the air supply direction of the second fan 33 have the following relations: when the curving direction of the blades of the first fan 32 is opposite to that of the second fan 33, and the rotating direction of the first fan 32 is opposite to that of the second fan 33, their air supply directions are the same, as shown in FIG. 3 and FIG. 4; and when the curving direction of the blades of the first fan 32 is the same with that of the second fan 33, and the rotating direction of the first fan 32 is the same with that of the second fan 33, their air supply directions are the same, as shown in FIG. 5 and FIG. 6.

The housing 1 is also provided with a refrigerating system 4 (comprising, but being not limited to, structures such as a compressor and an outdoor heat exchanger) therein to ensure the normal operation of the air conditioner outdoor unit.

Further, the electric motor is a variable-frequency axial air gap electric motor 31.

As the electric motor is a variable-frequency axial air gap electric motor 31, the stator 311 and the rotors 312 of the electric motor form an axial air gap, which helps reduce the radial size of the electric motor, and helps reduce the size of the air conditioner outdoor unit, and thus, the present disclosure makes it convenient to assemble the electric motor in the housing 1 and lower requirements of the air conditioner outdoor unit on assembling space, and helps expand the application range of the air conditioner outdoor unit. The present disclosure ensures the adjustability of the rotating speeds and the rotating directions of the two rotors 312, and further adjusts the cooperation modes of the first fan 32 and the second fan 33 so as to meet different functional needs of the air conditioner outdoor unit.

For example, the variable-frequency axial air gap electric motor 31 comprises a stator 311 and the two rotors 312, as shown in FIG. 7. The stator 311 comprises a stator core 3111 and two sets of windings 3115 independent of each other, as shown in FIG. 8, both ends of the axial direction of the stator core 3111 are provided with stator teeth protruding towards both sides of the axial direction of the stator core, and the two sets of windings 3115 are respectively wound on two sets of stator teeth. The two rotors 312 are coaxially arranged on both sides of the axial direction of the stator 311 opposite to each other, as shown in FIG. 7, and form an axial air gap with the stator 311.

The present disclosure achieves the independent outputs of dual powers of one electric motor through using the cooperation between the one stator 311 and the two rotors 312 independent of each other and the two output shafts independent of each other, and thus the two fans can be driven to rotate at their own rotating speeds and in their own rotating directions, while do not interfere with each other. Compared with a technical solution that two electric motors extend in an axial direction opposite to each other and are connected with two fans respectively, the present disclosure at least saves one stator 311, reduces the axial size of the draught fan 3, reduces the cost of the draught fan 3, and further helps reduce the size of the air conditioner outdoor unit and reduce the cost thereof. Compared with a technical solution that one electric motor with a single shaft cooperates with a gear mechanism to achieve extending towards two ends in an axial direction, the present disclosure achieves that two fans rotate at any rotating speeds and in any rotating directions, and thus has excellent practical functionality, significantly improves the functional diversification of the draught fan 3, and thus improves the functional diversification of the air conditioner outdoor unit, saves the gear mechanism and lowers manufacturing and mounting difficulty of the product.

Figure 10:
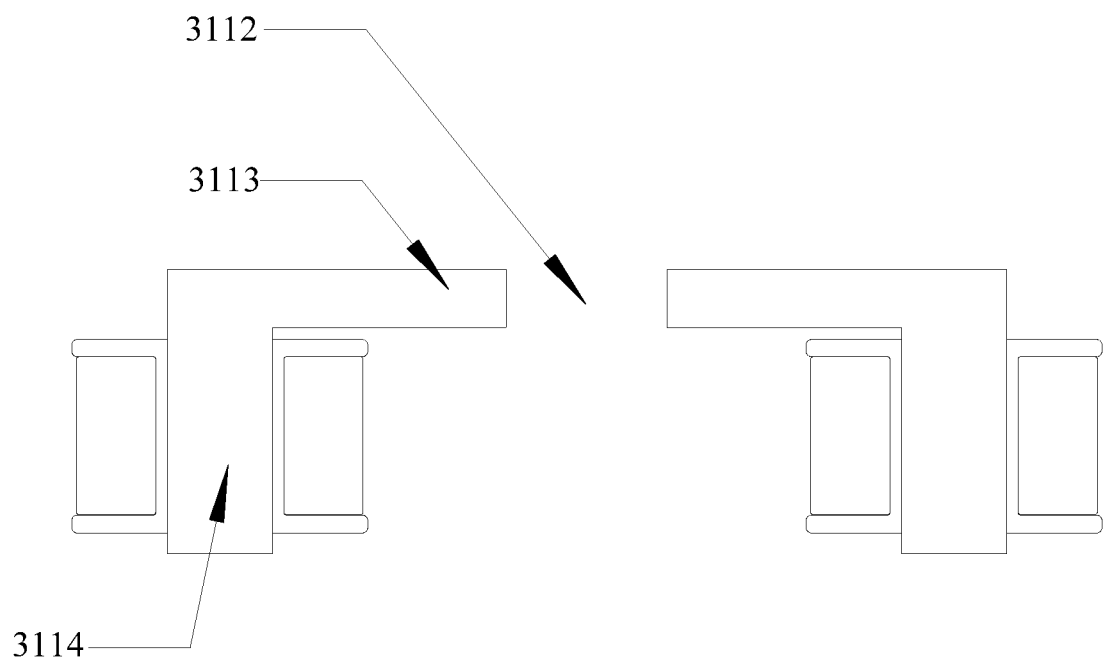
FIG. 10 is a schematic view of the structure of the stator in FIG. 9.

Further, the center portion of the stator core 3111 is disposed with a hollow channel 3112 in a radial direction (as shown in FIG. 8 and FIG. 10), and at least a portion of the first output shaft 3131 and at least a portion of the second output shaft 3132 are disposed within the hollow channel 3112.

The center portion of the stator core 3111 is provided with a hollow channel 3112 in the radial direction, which provides a helpful axial mounting space for the mounting of the first output shaft 3131 and the second output shaft 3132, so that the two output shafts can be partially or completely accommodated in the hollow channel 3112 of the stator core 3111, thereby further decreasing the axial size of the electric motor.

Compared with a conventional radial electric motor, the increase of the axial space, which is due to the reason that the output shaft must be supported by end portions, can be avoided, and the axial space of the electric motor is effectively decreased. In addition, the action radius of the electromagnetic force of the axial air gap electric motor 31 is rendered to move outwardly, which means that the torque generated by the same electromagnetic force increases; and then, under a fixed design torque, the electromagnetic force needed by the axial air gap electric motor is reduced, and thereby, the design size and the space of the electromagnets will be reduced, which is helpful for the miniaturization of the electric motor.

Further, the electric motor can further comprise a shaft sleeve which is disposed in the hollow channel 3112, and a portion of the two output shafts is inserted in the shaft sleeve.

The shaft sleeve is disposed in the hollow channel 3112, and then one end of the two output shafts is inserted into the shaft sleeve; thus, the shaft sleeve can have a good limiting function to the two output shafts, which ensures that the two output shafts and the stator 311 do not interfere with each other, lowers the probability of the situations of the two output shafts such as swaying, tilting and displacing, and thus improves the coaxiality of the two output shafts, and helps enhance the reliability of the electric motor in use, meanwhile improving the assembling accuracy of the two output shafts and makes the mounting more convenient.

Alternatively, the support bearing of the first output shaft 3131 and the support bearing of the second output shaft 3132 can be directly disposed within the hollow channel 3112, and the support bearings are used to support the first output shaft 3131 and the second output shaft 3132, which can significantly improve the reliability of the rotating shafts.

Further, the stator core 3111 comprises a stator yoke 3113 and a plurality of stator tooth portions 3114 arranged along a circumferential direction of the stator yoke 3113, the plurality of stator tooth portions 3114 are assembled with the stator yoke 3113 to form the stator core 3111, and the plurality of stator tooth portions 3114 protrude along the axial direction of the stator yoke 3113 to form the stator teeth. The rotor 312 comprises a rotor disk 3121 and a permanent magnet 3122 provided on the rotor disk 3121 (as shown in FIG. 11).

The stator core 3111 comprises a stator yoke 3113 and a plurality of stator tooth portions 3114, and the plurality of stator tooth portions 3114 are assembled with the stator yoke 3113 to form the stator core 3111, and the stator yoke 3113 and the stator tooth portions 3114 are detachably connected to each other, and thus, the windings 3115, when wound, will not be restricted by the shape of the stator core 3111, and each stator tooth portion 3114 can further be connected with the stator yoke 3113 after the windings 3115 are wound, and the winding manner is flexible and thus the winding efficiency of the windings 3115 is improved. In addition, through reasonably disposing the size of the stator tooth portions 3114 or the distance between the stator tooth portions 3114, the size of a winding groove can be adjusted, so that the number of the sets of the windings 3115 can be disposed flexibly and the power rating of the stator core 3111 can be adjusted appropriately. The stator tooth portions 3114 and the stator yoke 3113 can also be integrally formed.

Figure 11:
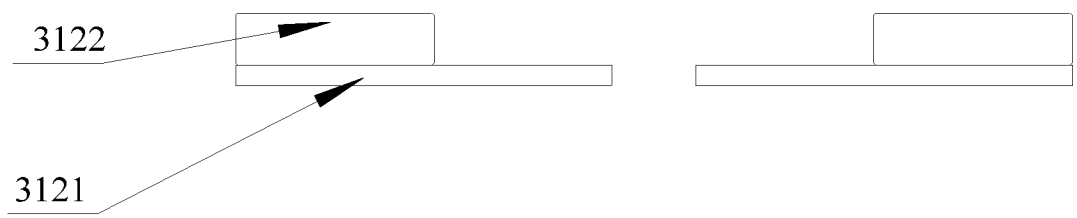
FIG. 11 is a schematic view of the structure of a rotor provided in an embodiment of the present disclosure.

The rotor 312 comprises a rotor disk 3121 and a permanent magnet 3122 (as shown FIG. 11). The rotor disk 3121 is used as a mounting carrier of the permanent magnet 3122, and achieves the coaxial connection between the rotor 312 and the first output shaft 3131 or the second output shaft 3132. The permanent magnet 3122 is installed on the rotor disk 3121, generates a magnetic field which is interactive with the stator, and makes the rotors to integrally form a flat disk structure, which helps further decrease the axial size of the electric motor.

The external portion of the body of the rotor disk 3121 is a disk-shaped structure, and has a relatively regular structure, which achieves convenient processing and molding, and favors the arrangement of a plurality of permanent magnets 3122, the internal portion of the disk body is a disk-shaped structure or a conical structure, which helps reasonably design the assembling structure of the rotor disk 3121 and a rotating shaft assembly according to the specific structure of a product, and provides a helpful space for the mounting of other parts.

For example, the permanent magnet 3122 is a circular or fan-shaped pie structure, there are a plurality of permanent magnets 3122, the plurality of permanent magnets 3122 are uniformly disposed on the surface of the axial direction of the rotor disk 3121 towards the stator yoke 3113, to form an axial magnetic flux, and the N-poles and the S-poles of two adjacent permanent magnets 3122 are arranged alternatively or in a Halback array.

The permanent magnet 3122 is a circular or fan-shaped pie structure, which is convenient for the arrangement and reduces the axial size of the electric motor, the plurality of permanent magnets 3122 are arranged uniformly on the surface of the rotor disk 3121 towards the stator yoke in a circumferential direction of the rotor disk 3121, so that an axial magnetic flux is formed between the rotor 312 and a stator assembly. The N-poles and the S-poles of two adjacent permanent magnets 3122 can be arranged alternatively, or in a Halback array, and this can be adjusted according to the requirements of the product.

Figure 9:
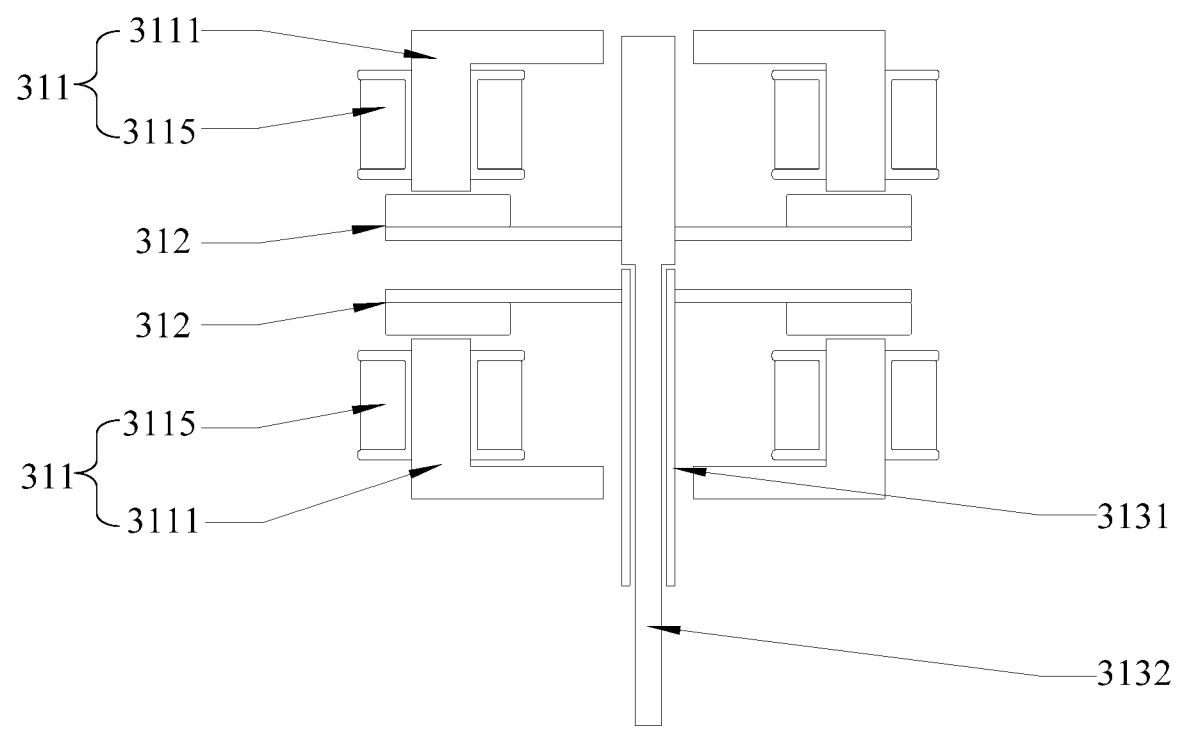
FIG. 9 is a schematic view of the structure of an electric motor provided in an embodiment of the present disclosure.

At least one of the first output shaft 3131 and the second output shaft 3132 is a hollow shaft, as shown in FIG. 7 and FIG. 9, the other one goes through the hollow shaft and outputs from the same side of the axial direction of the electric motor, and is adapted to rotate with respect to the hollow shaft.

One of the first output shaft 3131 and the second output shaft 3132 is a hollow shaft, and then the other one can protrude out through the hollow shaft, thereby achieving the protruding of the first output shaft 3131 and the second output shaft 3132 in the same direction, so that one end of the axial direction of the electric motor can be connected with two fans at the same time. With regard to the other output shaft, it can be a solid shaft, which helps improve the strength of the output shaft. The other output shaft can also be a hollow shaft.

Further, a heat exchanger 2 is provided in the housing 1, and is provided at the first air exchange port 11.

A heat exchanger 2 is provided in the housing 1 so as to ensure that the air conditioner outdoor unit exchanges heat with the outside, and the heat exchanger 2 is provided at the first air exchange port 11, and then when the air flow enters the air conditioner outdoor unit through the first air exchange port 11, rainwater may also enter the air conditioner outdoor unit through the first air exchange port 11 on a rainy day, which gets the heat exchanger 2 or other structures of the air conditioner outdoor unit damp. At this moment, the first fan 32 and the second fan 33 can be controlled to supply air to the first air exchange port 11, the air flow will go through the heat exchanger 2 and blows out from the first air exchange port 11, and then the self-drying of the air conditioner outdoor unit is achieved, which helps improve the reliability of the air conditioner outdoor unit in use.

For example, the axis of draught fan 3 is along a vertical direction, as shown in FIG. 2.

The axis of the draught fan 3 extends along a vertical direction, then the air supply direction of the first fan 32 and the second fan 33 is in a vertical direction, and the mounting surface that the draught fan 3 needs is a horizontal plane. Thus, in the case that the fans of the air conditioner outdoor unit are heavy, they will not be affected by the gravity and continuously keep good rigidity, which reduces the abrasion of the draught fan 3 and is suitable for air conditioner outdoor units with high power requirements.

Embodiment 2

With respect to the embodiment 1, a difference lies in that the variable-frequency axial air gap electric motor 31 comprises two stators 311 and two rotors 312, and the two stators 311 correspond to the two rotors 312 one by one, as shown in FIG. 9. Each of the stators 311 comprises a stator core 3111 and windings 3115, as shown in FIG. 10, each of the stator cores 3111 is provided with stator teeth protruding towards the axial direction at the end of the axial direction, the stator teeth are wound with the corresponding windings 3115, each of the rotors 312 is provided at the side of the axial direction of the stator 311 corresponding to it, and form an axial air gap with the corresponding stator 311.

The present disclosure achieves the independent outputs of dual powers of one electric motor through using the cooperation between the two stators 311 and the two rotors 312 and two rotating shafts, which is equivalent to the integration of the inner structures of the two electric motors, and compared with the solution of using two independent electric motors, the present disclosure decreases the number of the mounting racks 5, lowers the mounting difficulty of the draught fan 3, and reduces the mounting space of the draught fan 3. In addition, the each stator 311 and each rotor 312 can be designed reasonably according to requirements, so as to meet the functional needs of the product.

Further, the two rotors 312 are arranged opposite to each other and provided at the inner sides of the axial direction of the two stators 311, as shown in FIG. 9.

The two rotors 312 are arranged opposite to each other and provided at the inner sides of the axial direction of the two stators 311, and thus a relatively good processability is acquired and the assembling is convenient.

The two rotors 312 can also be provided at the external sides of the axial direction of the two stators 311, or one is provided at the inner sides of the axial direction of the two stators 311 while the other is provided at the external sides of the axial direction of the two stators 311.

Embodiment 3

With respect to the embodiment 1 or the embodiment 2, a difference lies in that the axial of the draught fan 3 is along a horizontal direction, as shown in FIG. 1.

The axis of the draught fan 3 extends along a horizontal direction, then the air supply direction of the first fan 32 and the second fan 33 is in a horizontal direction, and the mounting surface required by the draught fan 3 is in a vertical plane, which helps mount the air conditioner outdoor unit at the outer side of the wall, in consideration of the effect of gravity, the product is relatively suitable for an air conditioner outdoor unit with a low power requirement.

Embodiment 4

With respect to any one of the above embodiments, a difference lies in that, based on any one of the above embodiments, the air conditioner outdoor unit further comprises a controller 8 which is electrically connected with the draught fan 3 for controlling the start and stop, the rotating speeds and the rotating directions of the first fan 32 and the second fan 33.

The air conditioner outdoor unit further comprises a controller 8, wherein the controller 8 is electrically connected with the draught fan 3, and can control the start and stop, the rotating speeds and the rotating directions of the first fan 32 and the second fan 33, so that the draught fan 3 can be used in the normal cooling or heating process of the air conditioning apparatus, and can also be used independently, thereby improving the functionality of the air conditioner outdoor unit. For example, when the air conditioner outdoor unit needs to be cleaned, the draught fan 3 starts respectively, and strips off the dust, greasy dirt, litter and the like on the component which needs to be cleaned; when the air conditioner outdoor unit needs to be dried, the draught fan 3 starts respectively to blow air to the first air exchange port 11 to conduct self-drying. The controller 8 can be integrated in the control system of the air conditioning apparatus, or disposed respectively.

The controller 8 is adapted to control the first fan 32 and the second fan 33 to supply air to the second air exchange port 12 by a fixed combination of rotating speeds.

Further, the controller 8 is adapted to control the first fan 32 and the second fan 33 to supply air to the first air exchange port 11 by a fixed combination of rotating speeds.

In a normal operating process of a cooling mode or a heating mode of the air conditioning apparatus, one of the two air exchange ports is an air inlet and the other is an air outlet, which is generally determined by the positions of the first air exchange port 11 and the second air exchange port 12.

Since the draught fan 3 comprises two fans, and the two fans can make the draught fan 3 generate the same air volume by different combinations of rotating speeds. When the air volume of the draught fan 3 is fixed, the heat exchange effect of the air conditioner outdoor unit can be detected through changing the combination of rotating speeds of the first fan 32 and the second fan 33, and a better combination of rotating speeds is further rendered, so that the air volume of the draught fan 3 and the combination of rotating speeds of the two fans form a fixed matching method. Thus, the first fan 32 and the second fan 33 supply air to the air outlet by certain fixed combinations of rotating speeds in use, so that the air conditioner outdoor unit has the best heat exchange effect and efficiency under a corresponding load, and the air conditioner outdoor unit achieves the object of saving energy and improving efficiency. A fixed load can be defined by a designer as a specific load value (i.e., the air volume of the air conditioner outdoor unit), or defined to indicate a certain degree of low load, medium load or high load (i.e., low air volume, medium air volume or high air volume), and under such loads, the first fan 32 and the second fan 33 supply air to the air outlet by a fixed combination of rotating speeds, so that the air conditioner outdoor unit has the best heat exchange effect and the best efficiency.

However, on rainy days or windy days, the air conditioner outdoor unit may be humidified due to the water entry, and further, the internal structures, such as the electric motor and the heat exchanger 2, of the air conditioner outdoor unit will be further affected or damaged, and in the normal operating process of a cooling mode or a heating mode of the air conditioning apparatus, the air flow usually enters the housing 1 through the air inlet and flows out of the housing 1 through the air outlet, and thus the rainwater at the air inlet may be further suctioned into the housing 1 and cause harmful consequences, while the rainwater and the like at the air outlet may be directly blown out to achieve drying. Therefore, the air conditioner outdoor unit is enabled to have the function of self-drying through controlling the first fan 32 and the second fan 33 to supply air to the air inlet, and thus the probability of failure of the air conditioner outdoor unit due to moisture is reduced. Further, when the air volume or the power of the draught fan 3 is fixed, the two fans can have different combinations of rotating speeds. When the air volume or the power of the draught fan 3 is fixed, the self-drying effect of the air conditioner outdoor unit can be detected through changing the combinations of rotating speeds of the first fan 32 and the second fan 33, and then a better combination of rotating speeds is further acquired, so that the air volume or the power of the draught fan 3 and the combination of rotating speeds of the two fans form a fixed matching method. Thus, when the air conditioner outdoor unit needs to be dried by itself, the first fan 32 and the second fan 33 are controlled by the controller 8 to supply air to the air inlet by certain fixed combinations of rotating speeds, so that the air conditioner outdoor unit has the best self-drying effect and efficiency under corresponding air volumes or powers.

Therefore, when the first air exchange port 11 is the air inlet and the second air exchange port 12 is the air outlet, the controller 8 controls the first fan 32 and the second fan 33 to supply air to the second air exchange port 12 by a fixed combination of rotating speeds, so that the air conditioner outdoor unit has the best heat exchange effect and efficiency under certain fixed loads. The controller 8 controls the first fan 32 and the second fan 33 to supply air to the first air exchange port 11 by a fixed combination of rotating speeds, so that the air conditioner outdoor unit has the best self-drying effect and efficiency under certain fixed powers or air volumes. Based on the same reasons, when the first air exchange port 11 is the air outlet and the second air exchange port 12 is the air inlet, the controller 8 controls the first fan 32 and the second fan 33 to supply air to the first air exchange port 11 by a fixed combination of rotating speeds, so that the air conditioner outdoor unit has the best heat exchange effect and efficiency under certain fixed loads; the controller 8 controls the first fan 32 and the second fan 33 to supply air to the second air exchange port 12 by a fixed combination of rotating speeds, so that the air conditioner outdoor unit has the best self-drying effect and efficiency under certain fixed powers or air volumes.

Further, the controller 8 is adapted to control at least one of the first fan 32 and the second fan 33 to operate at a constant rotating speed or a variable rotating speed, to form a constant impact air flow or a variable impact air flow.

The controller 8 controls the draught fan 3 to operate to form a constant impact air flow or a variable impact air flow which acts on substances such as dust, greasy dirt and litter accumulated on the housing 1, the heat exchanger 2 or other components of the air conditioner outdoor unit, thereby achieving automatic stripping off the substances such as dust, greasy dirt and litter from the air conditioner outdoor unit due to the air flow impact, and thus, the air conditioner outdoor unit has the function of self-cleaning, thereby reducing the frequency of manual overhauling or manual cleaning, and then improving the user experience. For example, the first fan 32 and the second fan 33 can be configured to have a constant rotating speed at the same time, and thus, the draught fan 3 generates a constant impact air flow, i.e., the speed and the air supply angle of the air flow maintain constant, and further, the air conditioner outdoor unit has the function of self-cleaning. One of the first fan 32 and the second fan 33 may also be configured to have a constant rotating speed and the other is configured to have a variable rotating speed, or both the first fan 32 and the second fan 33 are configured to have a variable rotating speed, so that the draught fan 3 generates an impact air flow in which the wind speed is changed while the air supply angle keeps unchanged, or the air supply angle is changed while the wind speed keeps unchanged, or both the wind speed and the air supply angle are changed, and such changed impact air flow can act on different components of the air conditioner outdoor unit like scanning, and thus, the air conditioner outdoor unit has the comprehensive function of self-cleaning.

Further, the controller 8 is adapted to control the first fan 32 and the second fan 33 to operate at a fixed rotating speed or operate at a variable speed in a rotating speed range with top and bottom floating thresholds based on the fixed rotating speed, so that an operating frequency of the draught fan 3 reaches a resonant frequency of a portion of the structures of the air conditioner outdoor unit.

The first fan 32 and the second fan 33 operate at a fixed rotating speed, so that the operating frequency of the draught fan 3 reaches a working frequency of a portion of the structures (such as the housing 1, the heat exchanger 2 or other components) of the air conditioner outdoor unit, and then, the portion of the structures will resonate and generate a relatively strong mechanical vibration, and further, substances such as dust, greasy dirt and litter are stripped off automatically from the air conditioner outdoor unit due to the mechanical vibration, and the air conditioner outdoor unit has the function of self-cleaning. Alternatively, based on the fixed rotating speed, appropriate top and bottom floating thresholds are set, and the first fan 32 and the second fan 33 operate at a variable speed in the rotating speed range, and the rotating speed changes slowly, and when the speed is changed to be the above fixed rotating speed, a portion of the structures of the air conditioner outdoor unit will resonate, when it deviates from the above fixed rotating speed, the portion of the structures will stop the strong vibration, which can prevent structure damage or failure of the structures of the air conditioner outdoor unit due to long time continuous resonance, and thus, on the basis of ensuring the use reliability of the air conditioner outdoor unit, the air conditioner outdoor unit has the function of self-cleaning.

With regard to setting the specific value of the threshold, it can be set according to needs, for example, it can be set to be 1% to 10% of the above fixed rotating speed, such as 2%, 5% or 8%.

It can be understood that the resonant frequencies of different components of the air conditioner outdoor unit are different, and thus, the above fixed rotating speed is changed based on the changes of the structures of the air conditioner outdoor unit.

Further, the controller 8 is adapted to control one of the first fan 32 and the second fan 33 to start first, and the other fan is adapted to start by the wind power of the fan that starts first.

The controller 8 can control the first fan 32 and the second fan 33 to start one after another, so that the fan that starts later is started by the wind power of the fan that starts first, and thus, a starting torque of one of the fans is reduced, which helps lower the power requirements of the electric motor and meanwhile helps achieve headwind start of the draught fan 3. For example, the draught fan 3 is disposed between the first air exchange port 11 and the second air exchange port 12, generally, one of the two air exchange ports (for example, the second air exchange port 12) is easily interfered by external environment, then the fan close to the first air exchange port 11 can be controlled to start first, and the fan that has started will provide certain start boost to the fan close to the second air exchange port 12. Thus, in the absence of external wind interference, the second fan 33 close to the second air exchange port 12 has a relatively small start torque, in the case of headwind, the fan close to the second air exchange port 12 can still start normally, thereby achieving headwind start.

The air conditioning apparatus provided by the embodiment according to the second aspect of the present disclosure comprises the air conditioner outdoor unit according to any one of the embodiments according to the first aspect, and an air conditioner indoor unit connected with the air conditioner outdoor unit.

The air conditioning apparatus provided by the embodiment according to the second aspect of the present disclosure comprises the air conditioner outdoor unit in any one of the embodiments according to the first aspect, and thus has all the beneficial effects of any one of the above embodiments, which will not be repeated herein.

At present, with the continuously increased demands on life quality, demands of better performance and more functions on air conditioner outdoor units are put forward. Currently, in order to acquire more house space, the mounting space of the air conditioner outdoor unit is compressed continuously. However, requirements on the performance of the air conditioner outdoor unit are not lowered but rather increased, and thus, an air conditioner outdoor unit with the design of extreme miniaturization and high performance is essential. At the same time, when designing the air conditioner outdoor unit, people always neglect the problems of dust and greasy dirt accumulation, wind or rain erosion or headwind disturbance which are generated from long time contact of the air conditioner outdoor unit with outside environment during use, which lower the performance of the draught fan. Therefore, how to achieve the self-cleaning, self-drying and headwind start of the air conditioner outdoor unit is of great importance.

The air conditioner outdoor unit and the air conditioning apparatus provided by the present disclosure can use one electric motor to drive the first fan and the second fan to rotate at the same speed, at different speeds, in the same direction or in different directions, so that the draught fan can supply air to the first air exchange port, to the second air exchange port, to a fixed point in the housing or to the housing comprehensively at different wind speeds or in different wind forms. Through configuring the rotating directions and the rotating speeds of the first fan and the second fan, the air conditioner outdoor unit has the functions of heat exchange, self-cleaning, self-drying, headwind start and the like. Meanwhile, the air conditioner outdoor unit has the advantages of easy mounting, small size and specification, large air volume, high energy efficiency, low manufacturing cost and etc.

In the present disclosure, the terms "first", "second", and "third" are used for the purpose of description only, and cannot be understood as indicating or implying relative importance, and the term "plurality" means two or more, unless otherwise expressly defined. The terms "installing", "connected", "connection", "fixing" and the like should be understood in a broad sense. For example, "connection" may be a fixed connection, a removable connection or an integral connection, and "connected" may refer to direct connection or indirect connection through an intermediary. A person of ordinary skills in the art could understand the specific meaning of the terms in the present disclosure according to specific situations.

In the description of the present disclosure, it should be understood that the orientation or position relationships indicated by the terms "upper", "lower", "left", "right", "front", "back" and the like are the orientation or position relationships based on what is shown in the drawings, are merely for the convenience of describing the present disclosure and simplifying the description, and do not indicate or imply that the device or unit referred to must have a particular direction and is constructed and operated in a specific orientation, and thus cannot be understood as the limitation of the present disclosure.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the specific features, structures, materials or characteristics described may be combined in a suitable manner in any one or more embodiments or examples.

The descriptions above are only preferred embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:

1. An outdoor unit for air conditioner, comprising:
a housing comprising a first air exchange port and a second air exchange port; and
a draught fan, arranged between the first air exchange port and the second air exchange port in the housing,
wherein the draught fan comprises an electric motor, a first fan and a second fan;
the electric motor comprising:
two rotors which rotate independently of each other; and
a first output shaft and a second output shaft which are connected to the two rotors respectively and protrude towards a same side of the electric motor along an axial direction of the electric motor; and
wherein the first output shaft and the second output shaft are fixedly connected to the first fan and the second fan respectively and are configured to drive the first fan and the second fan to rotate independently of each other.

2. The outdoor unit according to claim 1, wherein the electric motor comprises a variable-frequency axial air gap electric motor.

3. The outdoor unit according to claim 2, wherein:
the variable-frequency axial air gap electric motor comprises a stator and the two rotors,
the stator comprises a stator core and two sets of windings independent of each other, the two ends in the axial direction of the stator core are provided with stator teeth protruding towards two sides in the axial direction of the stator core, and the two sets of windings are respectively wound on the two sets of stator teeth, and
the two rotors are coaxially arranged on both sides in the axial direction of the stator opposite to each other, and form an axial air gap with the stator.

4. The outdoor unit according to claim 2, wherein:
the variable-frequency axial air gap electric motor comprises two stators and the two rotors, and the two stators correspond to the two rotors one by one, and
each of the stators comprises a stator core and a winding; each of the stator cores is provided at one end in the axial direction with stator teeth protruding along the axial direction; the stator teeth are wound with the winding corresponding to the stator teeth; and each rotor is provided at one side of the axial direction of the stator corresponding to the rotor, and forms an axial air gap with the corresponding stator.

5. The outdoor unit according to claim 4, wherein the two rotors are arranged opposite to each other and provided at an inner side of the axial direction of the two stators.

6. The outdoor unit according to claim 3, wherein:
a center portion of the stator core is provided with a hollow channel in a radial direction, and
at least a portion of the first output shaft and at least a portion of the second output shaft are arranged in the hollow channel.

7. The outdoor unit according to claim 4, wherein:
a center portion of each stator core is provided with a hollow channel in a radial direction, and
at least a portion of the first output shaft and at least a portion of the second output shaft are arranged in the hollow channel.

8. The outdoor unit according to claim 3, wherein:
the stator core comprises a stator yoke and a plurality of stator tooth portions arranged along a circumferential direction of the stator yoke; and the plurality of stator tooth portions are assembled with the stator yoke to form the stator core, and the plurality of stator tooth portions protrude along an axial direction of the stator yoke to form the stator teeth, and
each rotor comprises a rotor disk and a permanent magnet provided on the rotor disk.

9. The outdoor unit according to claim 4, wherein:
each stator core comprises a stator yoke and a plurality of stator tooth portions arranged along a circumferential direction of the stator yoke; and the plurality of stator tooth portions are assembled with the stator yoke to form the stator core, and the plurality of stator tooth portions protrude along an axial direction of the stator yoke to form the stator teeth, and
each rotor comprises a rotor disk and a permanent magnet provided on the rotor disk.

10. The outdoor unit according to claim 1, wherein:
one of the first output shaft and the second output shaft is a hollow shaft, and
the other one goes through the hollow shaft and outputs from the same side of the axial direction of the electric motor, and is adapted to rotate with respect to the hollow shaft.

11. The outdoor unit according to claim 1, wherein a heat exchanger is provided in the housing and the heat exchanger is provided at the first air exchange port.

12. The outdoor unit according to claim 1, further comprising a controller, wherein the controller is electrically connected with the draught fan, and is used for controlling the start and stop, the rotating speeds and the rotating directions of the first fan and the second fan.

13. The outdoor unit according to claim 12, wherein the controller is adapted to control the first fan and the second fan to supply air to the second air exchange port in a fixed combination of rotating speeds.

14. The outdoor unit according to claim 12, wherein the controller is adapted to control the first fan and the second fan to supply air to the first air exchange port in a fixed combination of rotating speeds.

15. The outdoor unit according to claim 12, wherein the controller is adapted to control at least one of the first fan and the second fan to operate at a constant rotating speed or a variable rotating speed, to form a constant impact air flow or a variable impact air flow.

16. The outdoor unit according to claim 12, wherein:
the controller is adapted to control the first fan and the second fan to operate at a fixed rotating speed or operate at a variable speed in a rotating speed range with top and bottom floating thresholds based on the fixed rotating speed, so that an operating frequency of the draught fan reaches a resonant frequency of a portion of the structures of the air conditioner outdoor unit.

17. The outdoor unit according to claim 12, wherein the controller is adapted to control one of the first fan and the second fan to start first, and the other fan is adapted to start by the wind power of the first started fan.

18. The outdoor unit according to claim 1, wherein:
the axis of the draught fan is along a vertical direction; or
the axis of the draught fan is along a horizontal direction.

19. An air conditioning apparatus comprising:
the outdoor unit according to claim 1; and
an indoor unit, being connected to the outdoor unit.

* * * * *